US006903886B2

(12) United States Patent
Matsuda et al.

(10) Patent No.: US 6,903,886 B2
(45) Date of Patent: Jun. 7, 2005

(54) MAGNETIC TRANSFER APPARATUS AND PARTICLE MONITORING METHOD

(75) Inventors: Nobuhide Matsuda, Kadoma (JP);
Taizou Hamada, Kadoma (JP);
Hideyuki Hashi, Kadoma (JP); Hiroshi Hashida, Kawasaki (JP); Eiichi Fujisawa, Kawasaki (JP); Shoichi Seki, Kawasaki (JP)

(73) Assignees: Matsushita Electric Industrial Co., Ltd., Osaka (JP); Fuji Electric Co., Ltd., Kanagawa (JP)

( * ) Notice: Subject to any disclaimer, the term of this patent is extended or adjusted under 35 U.S.C. 154(b) by 224 days.

(21) Appl. No.: 09/879,597

(22) Filed: Jun. 12, 2001

(65) Prior Publication Data

US 2002/0030908 A1 Mar. 14, 2002

(30) Foreign Application Priority Data

Jun. 12, 2000 (JP) ........................................ 2000-175234

(51) Int. Cl.[7] .............................................. G11B 5/086

(52) U.S. Cl. ........................................................ 360/15

(58) Field of Search ............................. 73/865.6, 865.8; 360/265.2, 128, 15, 16, 17, 97.02

(56) References Cited

U.S. PATENT DOCUMENTS 5,757,573 A    5/1998  Tokuyama et al. ............ 360/75
5,824,920 A  * 10/1998  Sugimoto et al. .......... 73/865.8

FOREIGN PATENT DOCUMENTS

EP          1260970       11/2002
JP        2002-269739      9/2002

* cited by examiner

Primary Examiner—Andrew L. Sniezek
Assistant Examiner—Glenda P. Rodriguez
(74) Attorney, Agent, or Firm—Jordan and Hamburg LLP

(57) ABSTRACT

Within a casing accommodating members for performing magnetic transfer of signals from one medium to another, a plurality of suction ports are fixedly disposed at various locations. Resin tubes connect the suction ports to respective particle counters for the measurement of particles at each location, whereby the source of particles is locatable.

10 Claims, 3 Drawing Sheets

MAGNETIC TRANSFER APPARATUS AND PARTICLE MONITORING METHOD

BACKGROUND OF THE INVENTION

The present invention relates to a magnetic transfer apparatus for transferring magnetic signals including formatting information or the like from a master disk onto a magnetic disk used in a hard disk drive or a floppy disk, and a method for monitoring particles which can be obstacles to the magnetic transfer of data.

Recent advanced magnetic recording techniques have made magnetic recording devices to have increasingly large capacity and small size. The increase in the recording capacity of hard disk drives due to high density recording is particularly noteworthy. A hard disk drive is normally composed of a plurality of magnetic disks, a plurality of magnetic heads respectively corresponding to each of the magnetic disks, and an electronic circuit for reading recorded signals. The magnetic disks are imprinted with magnetic signals including formatting information and address information during the fabrication process of the hard disk drive. While such writing of magnetic signals onto the magnetic disks can be done using the magnetic heads of the hard disk drive itself, it is the usual practice to transfer magnetic signals from a master disk collectively to several magnetic disks as slave disks, FIG. 4 shows a prior art magnetic transfer apparatus used for transferring data from a master disk to several slave disks.

The magnetic transfer apparatus includes a square casing 10 for accommodating other members. Clean air is supplied into the casing from above so that magnetic transfer is carried out in a clean environment. A cassette 11 accommodating a plurality of slave disks 1 is transferred into the casing 10, and the slave disks 1 are removed from the cassette 11 by a disk handler 13 one by one and transferred to a suction head 3 provided on a rotary index head 4. The rotary index head 4 includes four, equally spaced suction heads 3 along its periphery, so that each of the suction heads 3 moves from one to another of four stop positions A to D as the rotary index head 4 rotates intermittently. A position detector 5, a foreign substance inspection unit 6, a format device 7, and a transfer stage 8 are respectively disposed near or opposite each of the stop positions A to D. Thereby, as the rotary index head 4 rotates, a slave disk 1 held on the suction head 3 successively undergoes position detection, foreign substance inspection, erasion of surface magnetism, and magnetic transfer of data. A master disk 2 is held in the transfer stage 8 at the stop position D, and the slave disk 1 is brought in contact with the master disk 2 when transferring data thereonto.

An extremely high degree of cleanliness within the casing 10 is crucial when carrying out magnetic transfer of signals. Even a slightest amount of dust or particle present in air can constitute obstacles to the magnetic transfer of signals from the master disk 2 to the slave disk 1, which must be in close contact with each other. Particles may also cause scratches on the master disk 2, deteriorating its life. While the interior of the casing 10 is filled with clean air supplied from above, there still remains the possibility that particles are generated from various mechanical members in the casing 10. In prior art, a probe 16 is inserted into the casing 10 through a door 10a for measuring the cleanliness inside the casing. A resin tube 18 connects the probe 16 to a particle counter 17.

With such construction, however, when the door 10a is opened to insert the probe 16 into the casing 10, dust may be generated or outside foreign substances may enter the casing 10, thereby making accurate measurement of cleanliness impossible.

Also, since the source or the cause of the particles are hardly locatable, detection of particles provided no clues for the appropriate measures to be taken.

SUMMARY OF THE INVENTION

An object of the present invention is to provide a magnetic transfer apparatus and a particle monitoring method therefor, with which particles inside the magnetic transfer apparatus are accurately detected and the causes of the particles are specified.

A magnetic transfer apparatus according to the invention includes a base plate on which members for performing magnetic transfer of signals from one medium to another are placed, a casing on the base plate covering the members entirely, and a plurality of particle measurement devices fixed in the base plate.

The particle measurement device includes a suction port, a particle counter for measuring particles present in air sucked out from the casing through the suction port, and a tube for connecting the suction port to the particle counter. Because of this structure, the casing need not be opened for the measurement purpose, preventing foreign substances from entering from the outside. The suction port of each of the particle measurement device should preferably be disposed respectively near each of selected ones of the members, so as to ensure that the source of particles is more readily located.

A particle monitoring method for evaluating cleanliness in a magnetic transfer apparatus according to the invention includes:

measuring particles within the magnetic transfer apparatus by a plurality of particle measurement devices disposed at a plurality of measurement locations in the magnetic transfer apparatus;

specifying a source of particles based on numbers of particles measured at each of the measurement locations and numbers of particles measured in a time series at each of the measurement locations; and evaluating the cleanliness in the magnetic transfer apparatus based on the measurement results.

The use of the plurality of particle measurement devices enables distribution of particles or variation of cleanliness within the casing to be detected. Preferably, the evaluation of cleanliness is based on the numbers of particles measured in a time series at each of the measurement locations and a mean value of the measurement results. The sources or causes of particles are readily locatable based on the numbers of particles measured at various locations, in combination with the measurement results of the changes in the number of particles in a time series. Thereby, the environment within the magnetic transfer apparatus is optimally controlled These and other objects and characteristics of the present invention will become further clear from the following description with reference to the accompanying drawings.

DETAILED DESCRIPTION OF THE PREFERRED EMBODIMENTS

Preferred embodiments of the present invention will be hereinafter described with reference to the accompanying drawings.

Figure 1:
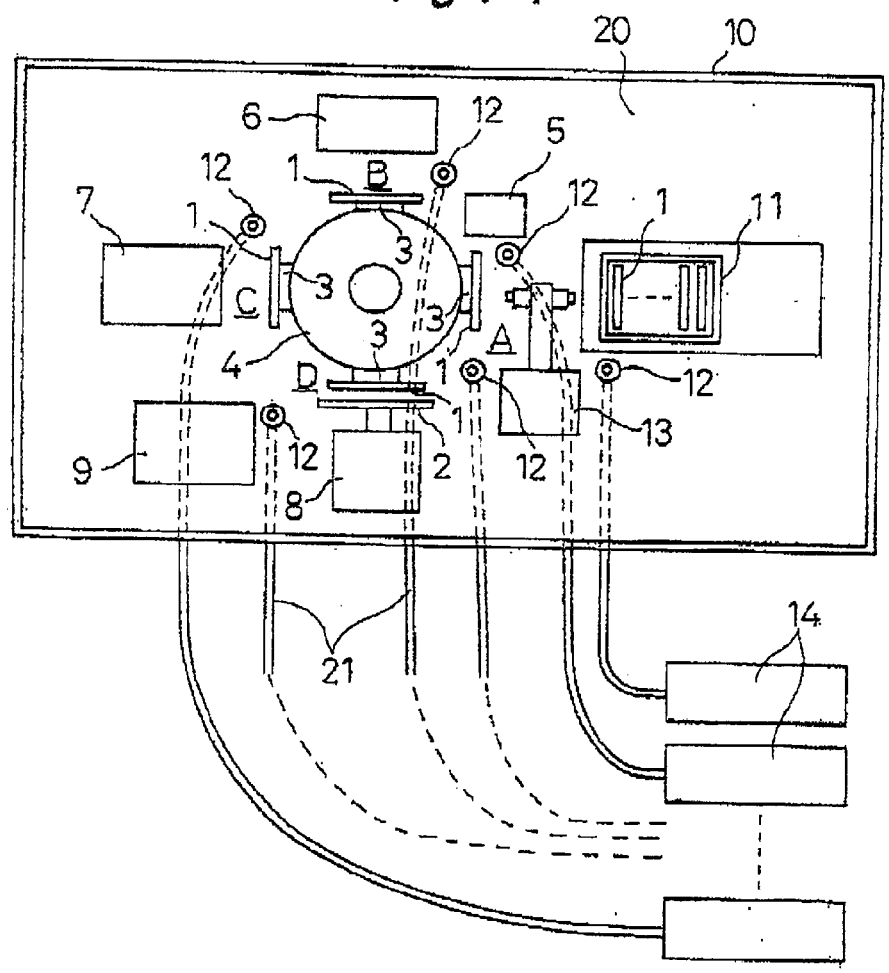
FIG. 1 is a schematic top plan view showing the construction of a magnetic transfer apparatus according to one embodiment of the present invention.
Figure 2:
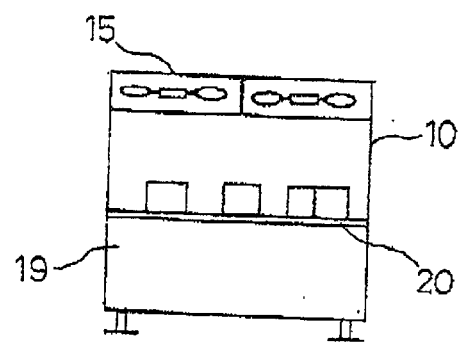
FIG. 2 is a schematic side view of the magnetic transfer apparatus.

FIGS. 1 and 2 illustrate a magnetic transfer apparatus according to one embodiment of the present invention. Within a casing 10 are accommodated members for performing magnetic transfer of signals from one medium to another. As shown in FIG. 2, the members are placed upon a base 20 on a bed frame 19, and the casing 10 is disposed thereupon entirely covering the base 20. An air supply unit 15 is provided on the casing 10 for supplying clean air into the casing from above.

A cassette 11 accommodating a plurality of slave disks 1 is transferred into the casing 10, and the slave disks 1 are removed from the cassette 11 by a disk handler 13 one by one and transferred to a suction head 3 provided on a rotary index head 4. The rotary index head 4 includes four, equally spaced suction heads 3 along its periphery, so that each of the suction heads 3 moves from one to another of four stop positions A to D as the rotary index head 4 rotates intermittently. A position detector 5, a foreign substance inspection unit 6, a format device 7, and a transfer stage 8 are respectively disposed near or opposite each of the stop positions A to D. Thereby, as the rotary index head 4 rotates, a slave disk 1 held on the suction head 3 successively undergoes position detection, foreign substance inspection, erasion of surface magnetism, and magnetic transfer of data. A master disk 2 is held in the transfer stage 8 at the stop position D and the slave disk 1 is brought in contact with the master disk 2 when transferring data thereonto. Reference numeral 9 denotes a master disk loader for supplying the master disk 2 to the transfer stage 8.

At a plurality of, for example six, locations on the base 20 are provided suction ports 12. The suction ports 12 communicate with resin tubes 21 passing through the base 20 and thereby are connected to their respective particle counters 14, so that particles are measured at a plurality of locations within the casing 10. In the illustrated example, the suction ports 12 are arranged respectively near the disk handler 13, position detector 5, foreign substance inspection unit 6, format device 7, master disk loader 9, and transfer stage 8. In this way, the source of particles is readily spotted. Instead of providing several particle counters 14, a single particle counter may be switchably connected to each of the resin tubes 21.

The suction ports 12 are fixedly disposed within the casing 10, so it is not necessary to open the casing 10 for the measurement of particles, ensuring prevention of contamination which was, in prior art, caused by the particle measuring operation.

Figure 3A:
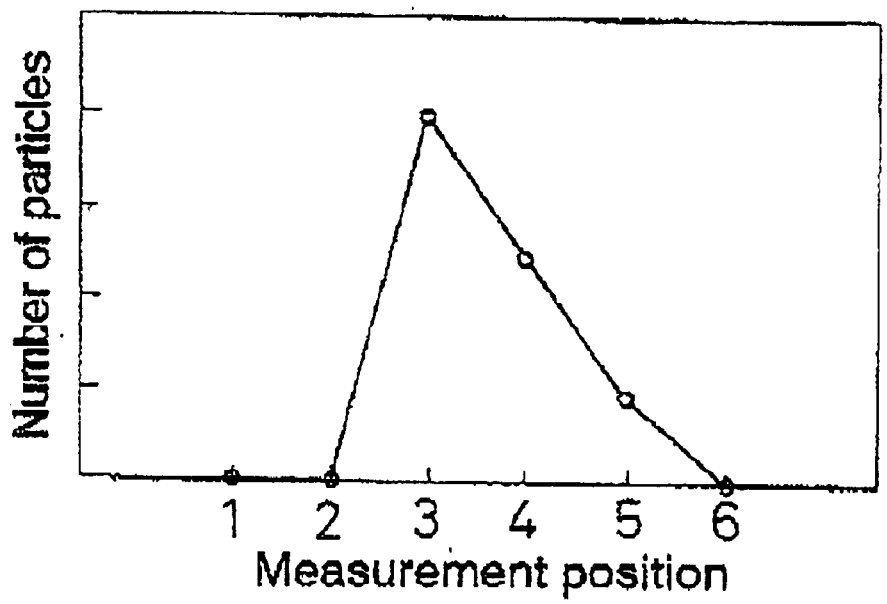
FIG. 3A is a graph showing the number of particles at each measurement position.

Referring to FIG. 3A showing the numbers of particles measured at each of the suction ports 12, it is determined that the source of particles is located at the measurement position III. Moreover, the graph shows that the number of particles decreases stepwise from the peak at position III toward the positions IV and V, implying a draft flowing towards the positions IV and V. Based on this measurement result, it is assumed that a problem exists in the direction of the draft or that any of the moving mechanical members has a problem. Thus, it is easy to take appropriate measures for dealing with whatever causes that are specified.

Figure 3B:
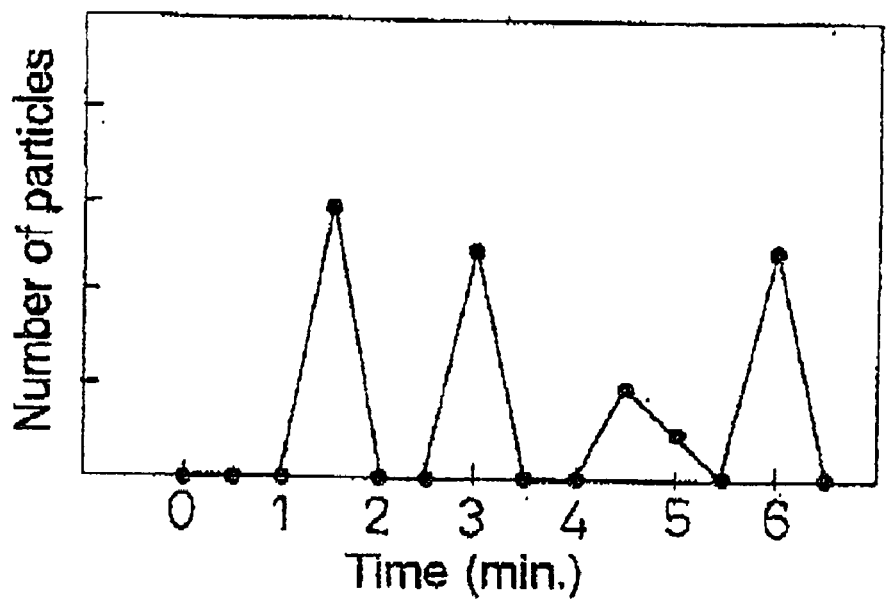
FIG. 3B is a graph showing changes in the number of particles at a specific position as time passes.
Figure 4:
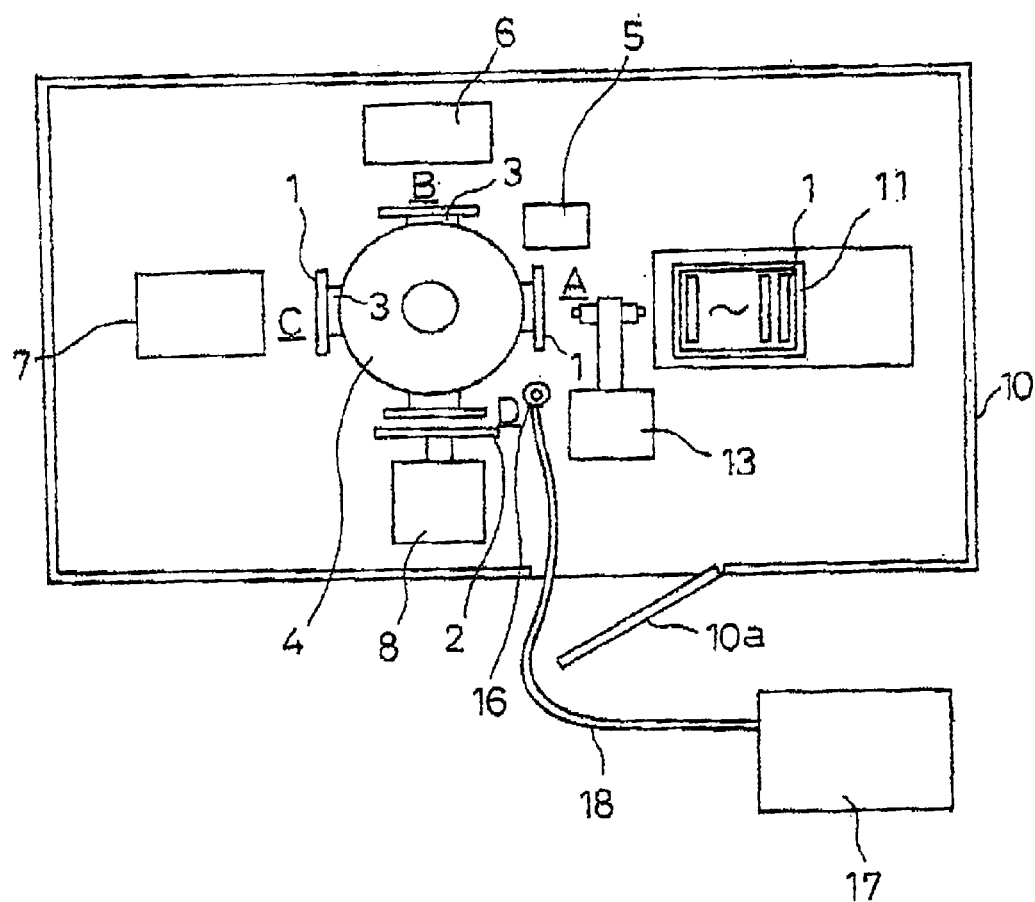
FIG. 4 is a schematic top plan view showing the construction of a conventional magnetic transfer apparatus.

The causes of particles are also detectable from the change in the number of particles as time passes. FIG. 3B is one example of measurement result, showing the changes in the number of particles as time passes, measured at a specific location. The graph indicates that particles are generated every third minute, approximately, based on which it is assumed that one of the members which operates at intervals of two minuets may be the source of the particles. In the illustrated example, the loader (not shown) for carrying in the cassette 11 into the casing 10 operates every third minute, and therefore it may have a problem.

Evaluation of cleanliness by the measurement of particles is based on a comparison between a mean value (n) of a certain number of times of measurement and a predetermined reference value, and between a maximum value (m) of the several times of measurement and a predetermined reference value.

For example, measurement is made five times. Provided that the result 1 and the result 2 are as follows:

Result 1: 0, 0, 0, 5, 0
Result 2: 4, 4, 4, 4, 4

If the evaluation were made based on a comparison between a maximum number of particles detected and a reference value which is for example 5, the result 1 would be determined as abnormal, while the result 2 would be determined as normal. Actually, however, the result 1 shows that there is virtually no particle, whereas the result 2 indicates that there is a problem as a certain amount of particles are generated regularly.

Therefore, according to the particle monitoring method of the invention, evaluation of cleanliness is made using both of a mean value (m) of measurement results and each measurement value (n), i.e., a predetermined degree of cleanliness is assumed to be achieved if the mean value of measurement results is lower than m, and each of the measurement value is lower than n. For example, by setting the reference values as m=2 and n=6, the above-mentioned result 1 is determined as normal and the result 2 is determined as abnormal.

The magnetic transfer apparatus according to the invention has a plurality of particle measurement devices fixedly disposed at a plurality of locations within the casing, whereby the source of particles is located, as well as the distribution of particles is detected. Thereby, measures to be taken are more easily determined.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A magnetic transfer apparatus including members for performing magnetic transfer of signals from one medium to another, comprising:
   a base plate on which the members are placed;
   a casing on the base plate enclosing the members entirely to prevent contamination from outside of the casing; and
   a plurality of particle measurement devices having suction ports fixed in dispersed positions in the base plate such that dispersion characteristics of contaminants is determinable with the casing entirely enclosing the members.

2. The magnetic transfer apparatus according to claim 1, wherein the particle measurement devices are disposed respectively near each of selected ones of the members.

3. The magnetic transfer apparatus according to claim 1, wherein each of the particle measurement devices includes a particle counter for measuring particles present in air drawn off from the casing through the suction port, and a tube for connecting the suction port to the particle counter.

4. The magnetic transfer apparatus according to claim 3, wherein the suction port of each of the particle measurement devices is disposed respectively near each of selected ones of the members.

5. A particle monitoring method for evaluating cleanliness in a magnetic transfer apparatus, including:
 measuring particles within the magnetic transfer apparatus by a plurality of particle measurement devices having suction ports disposed at a plurality of dispersed measurement locations in the magnetic transfer apparatus;
 specifying a source of particles based on numbers of particles measured at each of the measurement locations and numbers of particles measured in a time series at each of the measurement locations; and
 evaluating the cleanliness in the magnetic transfer apparatus based on the measurement results.

6. The particle monitoring method according to claim 5, wherein the evaluation of cleanliness is based on the numbers of particles measured in a time series at each of the measurement locations and a mean value of the measurement results.

7. A particle monitoring method for evaluating cleanliness in a magnetic transfer apparatus, including:
 measuring particles within the magnetic transfer apparatus by a plurality of particle measurement devices disposed at a plurality of measurement locations in the magnetic transfer apparatus;
 specifying a source of particles based on numbers of particles measured at each of the measurement locations and numbers of particles measured in a time series at each of the measurement locations;
 evaluating the cleanliness in the magnetic transfer apparatus based on the measurement results;
 evaluating cleanliness based on the numbers of particles measured in a time series at each of the measurement locations and a meat value of the measurement results; and
 correlating the measurement results to periodic operations of the members.

8. A particle monitoring method for evaluating cleanliness in a magnetic transfer apparatus, including:
 measuring particles within the magnetic transfer apparatus by a plurality of particle measurement devices disposed at a plurality of measurement locations in the magnetic transfer apparatus;
 specifying a source of particles based on numbers of particles measured at each of the measurement locations and numbers or particles measured in a time series at each of the measurement locations;
 evaluating the cleanliness in the magnetic transfer apparatus based on the measurement results; and
 correlating the measurement results to periodic operations of the members.

9. A particle monitoring method for evaluating cleanliness in a magnetic transfer apparatus, including:
 measuring particles within the magnetic transfer apparatus by a plurality of particle measurement devices disposed at a plurality of measurement locations in the magnetic transfer apparatus;
 specifying a source of particles based on numbers of particles measured at each of the measurement locations and numbers of particles measured in a time series at each of the measurement locations;
 evaluating the cleanliness in the magnetic transfer apparatus based on the measurement results; and
 the plurality of measurement devices including devices disposed respectively at a disk handler, a position detector, a foreign substance inspection unit, a format device, a master disk loader, and a transfer stage.

10. A magnetic transfer apparatus including members for performing magnetic transfer of signals from one medium to another, comprising:
 a base plate on which the members are placed;
 a casing on the base plate covering the members entirely;
 a plurality of particle measurement devices fixed in dispersed positions in the base plate; and
 the plurality of measurement devices including devices disposed respectively at a disk handler, a position detector, a foreign substance inspection unit, a format device, a master disk loader, and a transfer stage.

* * * * *